Patented July 14, 1931

1,814,414

UNITED STATES PATENT OFFICE

EDOUARD HORACE SIEGLER, OF SLIGO, MARYLAND

TREE BAND

No Drawing. Application filed April 11, 1928. Serial No. 269,313.

(GRANTED UNDER THE ACT OF MARCH 3, 1883, AS AMENDED APRIL 30, 1928; 370 O. G. 757)

This application is made under act of March 3, 1883, chapter 143 (22 Stat. 625) and the invention herein described and claimed may be used by the Government of the United States or any of its officers or employees in the prosecution of the work for the Government, or by any other person in the United States, without payment to me of any royalty thereon.

This invention relates particularly to tree bands coated or impregnated with a chemical compound especially adapted for destroying vermin, particularly the codling moth.

The present method of destroying codling moth larvæ cocooned beneath bands on trees involves the banding of the tree with cloth or other fabric, and the destruction of the codling moth larvæ that cocoons beneath such bands by hand labor.

As a result of experiments conducted by me, it has been found that when chemically-treated bands are suitably placed on trees in which the codling moth larvæ cocoon, the codling moth is automatically destroyed and the necessity of hand labor for their destruction is made unnecessary. In the use of my bands the codling moth is afforded an opportunity to cocoon and when this takes place, the chemical compound with which the band is coated or impregnated serves as a destructive agent for the moth.

My preferred type of band is made of crepe paper, although any other material of a similar or suitable nature may be employed. In the use of crepe paper bands I have found that bands of sufficient width, preferably four inches wide, to enable the codling moth larvæ to cocoon and of sufficient length to encircle the tree trunk, may be used. It is essential that the bands be cut parallel with the furrows or grain of the paper in order to avoid stretching of the bands after they have been applied or affixed to the tree. It is also desirable that the bands, after they have been cut, be folded along one edge to a depth of approximately one inch. When the bands are affixed to the tree, the fold should be uppermost and the flap should be placed next to the tree trunk. The folded edge strengthens the band and minimizes the removal of the chemical coating or impregnating material, hereinafter described, by rainfall, and tends to increase the catch of larvæ.

My preferred chemical compound for the destruction of the codling moth comprises a combinaion of beta-napthol and oil. In this mixture, the two ingredients combine mechanically and, when applied to the tree bands, either as a coating or as an impregnating material, the mixture is found to be almost entirely water-resistant and the chemical compound is not washed off by rainfall, dew, etc. While I prefer to use the ingredients above mentioned on my tree bands, it will be readily understood that any other insecticide, of a contact poisonous nature, for the destruction of the codling moth, may be employed in carrying out my invention. It will also be understood that while I prefer to use crepe paper in the practice of my invention, any other suitable material, such as cloth or other fabric, paper other than crepe paper, such, for instance as corrugated or crinkled paper, card-board, etc., may be used.

My preferred formula for the two ingredients named above is as follows:

Beta-naphthol (technical trade)__1 pound.
Lubricating oil (red engine type)__1½ pints.

It will also be understood that other oils than lubricating oil may be used in combination with beta-naphthol or other insecticide material. My preferred method of preparing the beta-naphthol and oil is to mix the two ingredients in a suitable container with the application of heat until all of the beta-naphthol has gone into solution. It is desirable that only sufficient heat be applied to hold the beta-naphthol in solution since, if too much heat is maintained, the chemical coating will not be sufficiently heavy. After the preparation of the coating material, the band may be impregnated by drawing it through the solution and allowing the surplus liquid to drain back into the cooking vat. By this method the chemical coating is distributed uniformly over the band and dries quickly without the appearance of any excess oil. The band is then ready for application to the tree. In applying the band to the tree, the trunk and also limbs thereof should be thoroughly scraped to remove loose bark.

No apparent injury to the trees has resulted from the use of beta-naphthol and lubricating oil. Small blister-like projections have been found where these bands have been used due probably to the fact that evaporation did not take place normally but, after the bands were removed, the blister-like growth became powdered and sloughed off. The inner bark of the trees was not injuriously affected by the use of my tree bands. It will be understood, of course, that any chemical compound used for insecticidal purposes in the destruction of the codling moth should be non-permanently injurious to the trees.

I claim:

1. A tree band impregnated with beta-naphthol and oil.

2. A tree band impregnated with a mixture of beta-naphthol and lubricating oil in the proportion of one pound of the former to 1½ pints of the latter.

3. A method of destroying the codling moth, comprising the application to trees in which the codling moth larvæ cocoon, of tree bands impregnated with a solution of beta-naphthol and oil.

EDOUARD HORACE SIEGLER.